Jan. 19, 1954  G. C. WYMAN  2,666,551
EGG POACHER
Filed Jan. 13, 1949
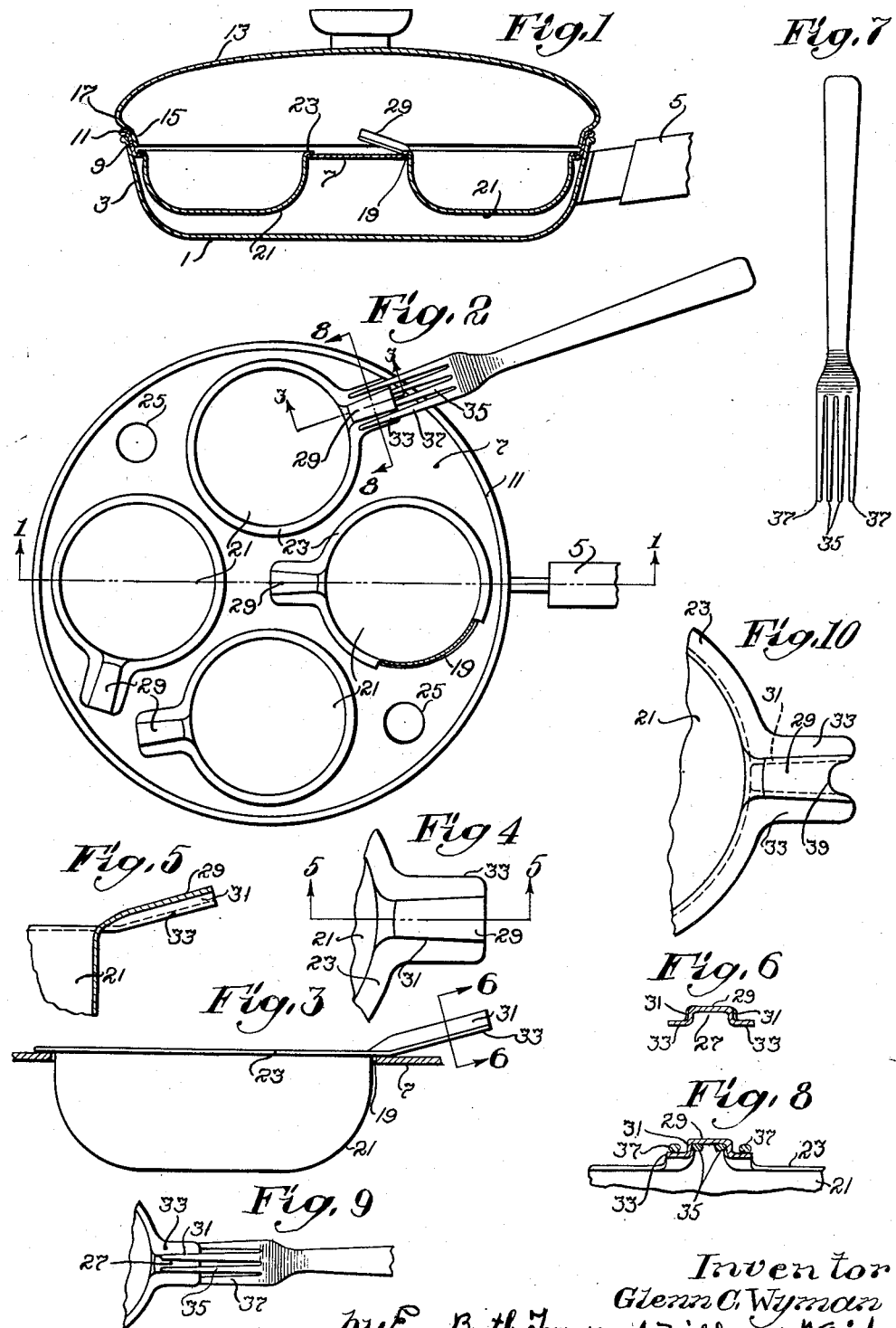
Inventor
Glenn C. Wyman
by Emery Booth Townsend Miller + Weidner
Attys.

Patented Jan. 19, 1954

2,666,551

UNITED STATES PATENT OFFICE 2,666,551

EGG POACHER

Glenn C. Wyman, Rome, N. Y., assignor to Revere Copper and Brass Incorporated, Rome, N. Y., a corporation of Maryland Application January 13, 1949, Serial No. 70,734

4 Claims. (Cl. 220—94)

My invention relates to egg poachers.

The invention has among its objects an egg poacher having provision for detachably securing a table fork or the like to the egg poaching cups to permit their ready removal and insertion when the poacher is hot. The invention, however, will be best understood from the following description when read in the light of the accompanying drawings of several embodiments of the invention selected for illustrative purposes, while the scope of the invention will be more particularly pointed out in the appended claims.

In the drawings:

Fig. 1 is a vertical transverse section of an egg poacher according to the invention, corresponding to a section on the line 1—1 of Fig. 2 with parts in elevation;

Fig. 2 is a plan of the egg poacher with the cover removed and a table fork attached to one of the egg poaching cups;

Fig. 3 is a fragmentary section on the line 3—3 of Fig. 2, on an enlarged scale and with parts omitted and parts in elevation;

Fig. 4 is a plan of the handle portion of the egg poaching cup according to Fig. 3;

Fig. 5 is a section on the line 5—5 of Fig. 4;

Fig. 6 is a section on the line 6—6 of Fig. 3;

Fig. 7 is a plan of a table fork which may be employed in connection with the poacher illustrated by the other figures of the drawings;

Fig. 8 is a section on the line 8—8 of Fig. 2;

Fig. 9 is a bottom view of a handle portion of one of the egg poaching cups with the fork attached, corresponding to a bottom view of the fork and handle portion of the egg poaching cup to which it is attached shown by Fig. 2; and Fig. 10 is a plan of the handle and adjacent portions of a modified form of egg poaching cup.

Referring to the drawings, the egg poacher illustrated comprises a container for the poaching liquid such as water, which container may be an ordinary skillet having a bottom 1, side walls 3 and a handle extension 5 carried by the side walls.

As shown, removably carried by the skillet is a support for the egg poaching cups comprising a circular plate 7 formed at its periphery to present an upwardly extending annular flange 9, this flange at its upper edge being bent outward to form a radially projecting annular bead 11. The support may be inserted within the skillet opening to cause the annular bead 11 of the support to rest on the upper edge of the side walls 3 of the skillet, the flange 9 of the support being received by the skillet preferably with a minimum of clearance between said flange and the inner surfaces of the side walls of the skillet so as to reduce to a minimum lateral movement of the support relative to the skillet.

As shown, the skillet is provided with a removable imperforate cover 13 having a lower annular flange 15 adapted to be received within the opening presented by the annular flange 9 of the egg poaching cup support. The cover adjacent the base of the flange 15 is shown as peripherally swelled outward, as indicated at 17, to form an annular radially extending shoulder which rests on the top of the annular bead 11 of the egg poaching cup support. In this way the cover forms a substantially fluid-tight joint with the egg poaching cup support.

As shown, the plate 7 is formed with openings 19 which receive the egg poaching cups 21, the side walls of the latter at their upper edges being outturned to provide annular radially projecting flanges 23 resting on the upper side of the plate adjacent the openings 19. The side walls of the cups preferably fit the openings 19 fairly closely so as to restrain the cups against substantial lateral movement relative to the plate 7. It will be understood that the poaching cups extend downward far enough below the plate 7 to adapt them to dip into the poaching liquid, the plate being shown as formed with perforations 25 for permitting the space beneath the skillet cover to be filled with steam so that all portions of the eggs in the poaching cups will be subjected to cooking temperature.

As shown, each poaching cup is provided with a short radially extending, and preferably slightly upwardly inclined, handle constituted by a laterally extending portion of the annular flange 23 of the cup. As shown, this handle is struck up to form a downwardly opening groove or channel 27 having a top wall 29 and opposite side walls 31, the groove at one end opening on the free end of the handle. Preferably, and as shown, the opposite side walls 31 of the groove taper toward each other as they progress from the free end of the handle toward the body of the cup. On each side of the handle adjacent the open longitudinally extending side of the groove are provided longitudinally extending flanges 33 forming continuations of the annular flange 23 of the cup.

The handle of the egg poaching cup, as shown, is designed to adapt it for removable attachment to the tines of a table fork, for example that illustrated in Fig. 7, when said tines are presented endwise to the handle and the fork pushed toward the cup. The two center tines 35 of the fork are received in the groove 27, the handle being preferably so designed that the outer edges of these two tines bear against the inner surfaces of the side walls 31 of the groove, the taper of these walls toward each other serving to spring the tines toward each other so that they bind frictionally against said walls. When the tines 35 of the fork are so inserted the two outer tines 37 are opposed to the upper sides of the flanges 33 of the handle, the parts preferably being so designed that the tines 37 contact with said upper sides while the tines 35 contact with the under side of the top wall 29 of the groove, this construction acting to reduce to a minimum tilting of the cup relative to the fork when the latter is employed for lifting the cup. In these connections it will be understood that the opening 19 in the plate 7 which receives the cup being of such diameter as to prevent substantial movement of the cup relative to the plate permits the fork readily to be inserted in the handle of the cup at the end of the poaching operation for removing the cup, and likewise the tines of the fork readily to be withdrawn from the handle after the cup by use of the fork is placed in the opening 19.

As shown by Fig. 10, if desired the top wall 29 of the cup handle may be notched across its full width adjacent the free end of the handle, as shown at 39 (Fig. 10), which permits the end portions of the two outer tines 37 of the fork to be placed on the side flanges 33 prior to the two center tines 35 being entered into the groove, so that by sliding the tines toward the body of the cup the two outer tines will act to guide the two center tines into the groove. In this way the fork may be attached to the cup handle with greater facility.

It will be understood that a three-tined fork or the like may be employed for attachment to the cup handle, in which case only the center tine entering the groove 27. Also it will be understood that it is not absolutely necessary that the two outermost tines of the fork bear against the upper surfaces of the side flanges 33 of the cup handle, and the tines between the outer tines bear against the under side of the top wall 29 of the groove 27 in the handle, for the full lengths of the portions of the tines received by the handle, although that is the preferred construction as it reduces to a minimum tilting of the cup relative to the fork. It further will be understood that within the scope of the appended claims other and wide deviations may be made from the forms of the invention described without departing from the spirit of the invention.

I claim:

1. A cup having a laterally extending handle adjacent its brim, which handle is shaped to present a longitudinally extending downwardly opening groove whcih at one end opens on the free end of said handle, and further to present a longitudinally extending flange at each of opposite sides of said groove exteriorly thereof, the upper sides of which flanges are at a level below the bottom interior surface of said groove, the groove being adapted to receive the two center tines of a four-tined table fork presented endwise to the free end of said handle with the two outer tines positioned above said flanges whereby the upper sides of said center tines may coact with said bottom interior surface of said groove and the under sides of said two outer tines coact with the upper sides of said flanges to prevent tilting of said cup relative to said fork when the latter is used for lifting said cup.

2. A cup having a laterally extending handle adjacent its brim, which handle is shaped to present a longitudinally extending downwardly opening groove which at one end opens on the free end of said handle, the interior side walls of said groove tapering toward each other from such end of said handle, and further to present a longitudinally extending flange at each of opposite sides of said groove exteriorly thereof, the upper sides of which flanges are at a level below the bottom interior surface of said groove, the groove being adapted to receive the two center tines of a four-tined table fork presented endwise to the free end of said handle with the two outer tines positioned above said flanges whereby the upper sides of said center tines may coact with said bottom interior surface of said groove and the under sides of said two outer tines coact with the upper sides of said flanges to prevent tilting of said cup relative to said fork when the latter is used for lifting said cup, the side walls of said groove being adapted to engage and spring toward each other the two center tines for causing them frictionally to bind against said side walls for frictionally removably securing said fork to said handle.

3. An egg poacher comprising an egg poaching cup and a part for removably supporting said cup for immersion in and removal from the poaching liquid adapted to restrain the cup substantially against lateral movement when it supports the cup; said cup being fixedly provided with a laterally projecting handle having a free end and elongated portions extending longitudinally thereof from such end for coacting with the tines of a table fork or the like having at least three tines, for adapting such fork, when the cup is so supported and restrained and such tines are presented endwise to said free end of said handle and the fork is pushed longitudinally of the handle toward the cup, to be removably secured to the handle for serving as a handle extension, said elongated longitudinally extending portions of the handle including a longitudinally extending groove opening on the free end of the handle and having a substantially flat bottom lying in one plane and side walls, lateral flanges integral with the sides of the walls of the said groove and offset from the bottom of the groove and having faces which face in the opposite direction from the bottom of the groove and lie in a common plane spaced from the plane of the bottom of the groove a distance substantially the thickness of the tines of a table fork, the width of the bottom of the groove being less than the width of a table fork, whereby the fork may be secured with at least one tine lying in the groove in contact with the bottom of the groove and one tine contacting said face of each flange.

4. An egg poacher comprising an egg poaching cup and a part for removably supporting said cup for immersion in and removal from the poaching liquid adapted to restrain the cup substantially against lateral movement when it supports the cup; said cup being fixedly provided with a laterally projecting handle having a free end and elongated portions extending longitudinally thereof from such end for coacting with the tines of a table fork or the like having at least four tines, for adapting such fork, when the cup is so supported and restrained and such tines are presented endwise to said free end of said handle and the fork is pushed longitudinally of the handle toward the cup, to be removably secured to the handle for serving as a handle extension, said elongated longitudinally extending portions of the handle including a longitudinally extending groove opening on the free end of the handle and having a substantially flat bottom lying in one plane and side walls, said side walls converging inwardly, lateral flanges integral with the sides of the walls of the said groove and offset from the bottom of the groove and having faces which face in the opposite direction from the bottom of the groove and lie in a common plane spaced from the plane of the bottom of the groove a distance substantially the thickness of the tines of a table fork, the width of the bottom of the groove being less than the width of a table fork, whereby the fork may be secured with at least two tines lying in the groove in contact with the bottom of the groove and one tine contacting said face of each flange and with the remotely opposite side faces of the tines in the groove frictionally in contact with the side walls of the groove.

GLENN C. WYMAN.

References Cited in the file of this patent

UNITED STATES PATENTS

| Number | Name | Date |
|---|---|---|
| 225,927 | Green | Mar. 30, 1880 |
| 430,984 | Benvenisti | June 24, 1890 |
| 451,166 | Bryant | Apr. 28, 1891 |
| 585,284 | Paden | June 29, 1897 |
| 590,509 | Blomberg | Sept. 21, 1897 |
| 641,273 | Coon | Jan. 16, 1900 |
| 734,054 | Frost | July 21, 1903 |
| 936,965 | Wells | Oct. 12, 1909 |
| 1,134,905 | Prochaska | Apr. 6, 1915 |
| 1,263,359 | Armstrong | Apr. 23, 1918 |
| 1,313,417 | Raymond | Aug. 19, 1919 |
| 1,364,552 | Hill | Jan. 4, 1921 |
| 1,698,914 | Kircher | Jan. 15, 1929 |
| 1,938,185 | Larsen | Dec. 5, 1933 |
| 2,133,252 | Moore et al. | Oct. 11, 1938 |
| 2,404,130 | Frank | July 16, 1946 |
| 2,432,792 | Ovenshire | Dec. 16, 1947 |